(12) United States Patent
Koganei et al.

(10) Patent No.: US 11,283,542 B2
(45) Date of Patent: Mar. 22, 2022

(54) ENCODING CIRCUIT, DECODING CIRCUIT, AND ENCODING METHOD

(71) Applicant: FUJITSU LIMITED, Kawasaki (JP)

(72) Inventors: Yohei Koganei, Kawasaki (JP); Kiichi Sugitani, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/093,862

(22) Filed: Nov. 10, 2020

(65) Prior Publication Data

US 2021/0218496 A1 Jul. 15, 2021

(30) Foreign Application Priority Data

Jan. 9, 2020 (JP) .............................. JP2020-002105

(51) Int. Cl.
*H04L 1/00* (2006.01)
*H04L 27/26* (2006.01)
*H04J 14/02* (2006.01)

(52) U.S. Cl.
CPC ........ *H04L 1/0041* (2013.01); *H04J 14/0227* (2013.01); *H04L 1/0015* (2013.01); *H04L 27/2604* (2013.01)

(58) Field of Classification Search
None
See application file for complete search history.

(56) References Cited

U.S. PATENT DOCUMENTS

| 10,091,046 | B1 | 10/2018 | Lefevre | |
| 11,038,597 | B2 * | 6/2021 | Mikami | ............... H04B 10/516 |
| 2002/0023247 | A1 * | 2/2002 | Akiyama | ................ H04L 1/006 |
| | | | | 714/758 |
| 2008/0163025 | A1 * | 7/2008 | Djordjevic | ............. H03M 13/11 |
| | | | | 714/755 |
| 2020/0044770 | A1 * | 2/2020 | Lefevre | ................. H04L 1/0065 |

FOREIGN PATENT DOCUMENTS

| EP | 3 588 883 A1 | 1/2020 |
| WO | WO 2018/114410 A1 | 6/2018 |
| WO | WO 2018/167920 A1 | 9/2018 |

OTHER PUBLICATIONS

F. Buchali et al., "Rate Adaptation and Reach Increase by Probabilistically Shaped 64-QAM: An Experimental Demonstration", Journal of Lightwave Technology, vol. 34, No. 7, Apr. 1, 2016.

* cited by examiner

*Primary Examiner* — Phung M Chung
(74) *Attorney, Agent, or Firm* — Staas & Halsey LLP

(57) ABSTRACT

An encoding circuit includes an allocator to allocate a symbol to bit-strings within a first frame, a converter to convert values of target-bit-strings that exclude a predetermined-bit-string so that, as a region within the constellation is closer to a center of the constellation, a number of symbols allocated in the region is larger, a generator to generate an error-correction-code of the bit-strings, and an insertion circuit to delay the error-correction-code and insert the error-correction-code in the predetermined-bit-string within a second frame that succeeds the first frame, wherein the allocator allocates, to the bit-strings, one symbol that corresponds to the values of the target-bit-strings, the one symbol being within a quadrant that corresponds to a value of the predetermined bit-string, and wherein the converter switches, based on the value of the predetermined-bit-string, association relationships between the values of the target-bit-strings before and after the conversion.

7 Claims, 18 Drawing Sheets

FIG. 5

BEFORE PROBABILISTIC SHAPING

| SECOND QUADRANT | FIRST QUADRANT |
|---|---|
| P41  P31 | P21  P11 |
| P42  P32 | P22  P12 |
| P43  P33 | P23  P13 |
| P44  P34 | P24  P14 |
| THIRD QUADRANT | FOURTH QUADRANT |

↓

AFTER PROBABILISTIC SHAPING

| SECOND QUADRANT | FIRST QUADRANT |
|---|---|
| P41  P31 | P21  P11 |
| P42  P32 | P22  P12 |
| P43  P33 | P23  P13 |
| P44  P34 | P24  P14 |
| THIRD QUADRANT | FOURTH QUADRANT |

FIG. 6

Q VALUES

| LEVEL 2 | LEVEL 1 | LEVEL 0 |
|---|---|---|
| 0 | 0 | 0 |
| 0 | 0 | 1 |
| 0 | 1 | 1 |
| 0 | 1 | 0 |
| 1 | 1 | 0 |
| 1 | 1 | 1 |
| 1 | 0 | 1 |
| 1 | 0 | 0 |

I VALUES

| | LEVEL 2 | 1 | 1 | 1 | 1 | 0 | 0 | 0 | 0 |
|---|---|---|---|---|---|---|---|---|---|
| | LEVEL 1 | 0 | 0 | 1 | 1 | 1 | 1 | 0 | 0 |
| | LEVEL 0 | 0 | 1 | 1 | 0 | 0 | 1 | 1 | 0 |

FIG. 8

Q VALUES

| LEVEL 2 | LEVEL 1 | LEVEL 0 |
|---|---|---|
| 0 | 0 | 0 |
| 0 | 0 | 1 |
| 0 | 1 | 0 |
| 0 | 1 | 1 |
| 1 | 1 | 0 |
| 1 | 1 | 1 |
| 1 | 0 | 0 |
| 1 | 0 | 1 |

SECOND QUADRANT | FIRST QUADRANT

THIRD QUADRANT | FOURTH QUADRANT

I VALUES

| | | | | | | | | |
|---|---|---|---|---|---|---|---|---|
| LEVEL 2 | 1 | 1 | 1 | 1 | 0 | 0 | 0 | 0 |
| LEVEL 1 | 1 | 1 | 0 | 0 | 1 | 1 | 0 | 0 |
| LEVEL 0 | 1 | 0 | 1 | 0 | 1 | 0 | 1 | 0 |

| INPUT BIT STRINGS | | | OUTPUT BIT STRINGS | | |
|---|---|---|---|---|---|
| LEVEL 2 | LEVEL 1 | LEVEL 0 | LEVEL 2 | LEVEL 1 | LEVEL 0 |
| 0 | 0 | 0 | 0 | 1 | 1 |
| 0 | 0 | 1 | 0 | 1 | 0 |
| 0 | 1 | 0 | 0 | 0 | 1 |
| 0 | 1 | 1 | 0 | 0 | 0 |
| 1 | 0 | 0 | 1 | 0 | 0 |
| 1 | 0 | 1 | 1 | 0 | 1 |
| 1 | 1 | 0 | 1 | 1 | 0 |
| 1 | 1 | 1 | 1 | 1 | 1 |

| LEVEL 2 | 1 | 1 | 1 | 1 | 0 | 0 | 0 | 0 |
| LEVEL 1 | 1 | 1 | 0 | 0 | 1 | 1 | 0 | 0 |
| LEVEL 0 | 1 | 0 | 1 | 0 | 1 | 0 | 1 | 0 |

| INPUT BIT STRINGS ||  OUTPUT BIT STRINGS ||
|---|---|---|---|
| LEVEL 1 | LEVEL 0 | LEVEL 1 | LEVEL 0 |
| 0 | 0 | 0 | 1 |
| 0 | 1 | 0 | 0 |
| 1 | 0 | 1 | 0 |
| 1 | 1 | 1 | 1 |

FIG. 14

Q VALUES

| LEVEL 3 | LEVEL 2 | LEVEL 1 | LEVEL 0 |
|---|---|---|---|
| 0 | 0 | 0 | 0 |
| 0 | 0 | 0 | 1 |
| 0 | 0 | 1 | 0 |
| 0 | 0 | 1 | 1 |
| 0 | 1 | 1 | 0 |
| 0 | 1 | 1 | 1 |
| 0 | 1 | 0 | 0 |
| 0 | 1 | 0 | 1 |
| 1 | 1 | 0 | 0 |
| 1 | 1 | 0 | 1 |
| 1 | 1 | 1 | 0 |
| 1 | 1 | 1 | 1 |
| 1 | 0 | 1 | 0 |
| 1 | 0 | 1 | 1 |
| 1 | 0 | 0 | 0 |
| 1 | 0 | 0 | 1 |

I VALUES

| | | | | | | | | | | | | | | | | |
|---|---|---|---|---|---|---|---|---|---|---|---|---|---|---|---|---|
| LEVEL 3 | 1 | 1 | 1 | 1 | 1 | 1 | 1 | 1 | 0 | 0 | 0 | 0 | 0 | 0 | 0 | 0 |
| LEVEL 2 | 0 | 0 | 0 | 0 | 1 | 1 | 1 | 1 | 1 | 1 | 1 | 1 | 0 | 0 | 0 | 0 |
| LEVEL 1 | 0 | 0 | 1 | 1 | 1 | 1 | 0 | 0 | 0 | 0 | 1 | 1 | 1 | 1 | 0 | 0 |
| LEVEL 0 | 1 | 0 | 1 | 0 | 1 | 0 | 1 | 0 | 1 | 0 | 1 | 0 | 1 | 0 | 1 | 0 |

FIG. 15

| INPUT BIT STRINGS | | | | OUTPUT BIT STRINGS | | | |
|---|---|---|---|---|---|---|---|
| LEVEL 3 | LEVEL 2 | LEVEL 1 | LEVEL 0 | LEVEL 3 | LEVEL 2 | LEVEL 1 | LEVEL 0 |
| 0 | 0 | 0 | 0 | 0 | 1 | 0 | 1 |
| 0 | 0 | 0 | 1 | 0 | 1 | 0 | 0 |
| 0 | 0 | 1 | 0 | 0 | 1 | 1 | 1 |
| 0 | 0 | 1 | 1 | 0 | 1 | 1 | 0 |
| 0 | 1 | 0 | 0 | 0 | 0 | 1 | 1 |
| 0 | 1 | 0 | 1 | 0 | 0 | 1 | 0 |
| 0 | 1 | 1 | 0 | 0 | 0 | 0 | 1 |
| 0 | 1 | 1 | 1 | 0 | 0 | 0 | 0 |
| 1 | 0 | 0 | 0 | 1 | 1 | 0 | 0 |
| 1 | 0 | 0 | 1 | 1 | 1 | 0 | 1 |
| 1 | 0 | 1 | 0 | 1 | 1 | 1 | 0 |
| 1 | 0 | 1 | 1 | 1 | 1 | 1 | 1 |
| 1 | 1 | 0 | 0 | 1 | 0 | 1 | 0 |
| 1 | 1 | 0 | 1 | 1 | 0 | 1 | 1 |
| 1 | 1 | 1 | 0 | 1 | 0 | 0 | 0 |
| 1 | 1 | 1 | 1 | 1 | 0 | 0 | 1 |

FIG. 17

| INPUT BIT STRINGS | | | OUTPUT BIT STRINGS | | |
|---|---|---|---|---|---|
| LEVEL 2 | LEVEL 1 | LEVEL 0 | LEVEL 2 | LEVEL 1 | LEVEL 0 |
| 0 | 1 | 1 | 0 | 0 | 0 |
| | 1 | 0 | | 0 | 1 |
| | 0 | 1 | | 1 | 0 |
| | 0 | 0 | | 1 | 1 |
| 1 | 0 | 0 | 1 | 0 | 0 |
| | 0 | 1 | | 0 | 1 |
| | 1 | 0 | | 1 | 0 |
| | 1 | 1 | | 1 | 1 |

ENCODING CIRCUIT, DECODING CIRCUIT, AND ENCODING METHOD

CROSS-REFERENCE TO RELATED APPLICATION

This application is based upon and claims the benefit of priority of the prior Japanese Patent Application No. 2020-002105, filed on Jan. 9, 2020, the entire contents of which are incorporated herein by reference.

FIELD

The embodiments discussed herein are related to an encoding circuit, a decoding circuit, and an encoding method.

BACKGROUND

With increases in transmission capacities of optical transmitting devices, multilevel modulation, such as quadrature phase-shift keying (QPSK), 16 quadrature amplitude modulation (QAM), and 64 QAM, is used, for example. In the multilevel modulation, a symbol that is among symbols arranged in a constellation and corresponds to a combination of values of each bit string within a frame signal to be modulated is allocated to the bit string (the allocation is hereinafter referred to as "symbol mapping"), and thus an optical signal with a phase and an intensity that are based on the symbol is generated.

A probabilistic shaping technique (hereinafter referred to as "PS") generates a probability distribution for symbol mapping by converting values of bit strings so that, as a region within a constellation is closer to the center of the constellation, the number of symbols allocated in the region is larger (refer to, for example, U.S. patent Ser. No. 10/091,046). This improves noise tolerance of signal light generated from a frame.

In the PS, for example, a distribution matching (DM) process is used to change a mark rate of a bit string to a rate (of, for example, 80%) of greater than 50% and bias bit values. The bit values are converted so that the probability of mapping a symbol is higher toward the center of the constellation in each of first to fourth quadrants into which the constellation is partitioned. To determine a quadrant in which a symbol to be allocated is located, a random bit that causes the mark rate to be maintained at approximately 50% is used.

As the random bit, a parity bit generated by an encoding process of forward error correction (FEC) to be executed to correct an error of a bit string is used, for example. When FEC is used in combination with the PS, the parity bit is inserted in any of bit strings not to be subjected to the DM process and is used to determine a quadrant of a constellation for formation of a distribution in which the probability of mapping a symbol is higher toward the center of the constellation (refer to, for example, "F. Buchali, et al., "Rate Adaptation and Reach Increase by Probabilistically Shaped 64-QAM: An Experimental Demonstration", JOURNAL OF LIGHTWAVE TECHNOLOGY, VOL., 34, NO. 7, Apr. 1, 2016").

SUMMARY

According to an aspect of the embodiments, an encoding circuit includes an allocator configured to allocate, to a plurality of bit strings within a first frame, a symbol that corresponds to each of values of the plurality of bit strings, the symbol being among a plurality of symbols within a constellation of multilevel modulation, a converter configured to convert values of target bit strings that exclude a predetermined bit string among the plurality of bit strings so that, as a region within the constellation is closer to a center of the constellation, a number of symbols allocated in the region among the plurality of symbols is larger, a generator configured to generate an error correction code for correcting an error of the plurality of bit strings after the conversion of the values of the target bit strings, and an insertion circuit configured to delay the error correction code and insert the error correction code in the predetermined bit string within a second frame that succeeds the first frame, wherein the allocator allocates, to the plurality of bit strings, one symbol that corresponds to the values of the target bit strings, the one symbol being among symbols within a quadrant that corresponds to a value of the predetermined bit string and among a plurality of quadrants into which the constellation is partitioned, and wherein the converter switches, based on the value of the predetermined bit string, association relationships between the values of the target bit strings before and after the conversion.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram illustrating an example of a probabilistic shaping process;

FIG. 6 is a diagram illustrating an example of symmetric symbol mapping;

FIG. 8 is a diagram illustrating an example of asymmetric symbol mapping;

FIG. 12 is a diagram illustrating an example of asymmetric symbol mapping when 16 QAM is used;

FIG. 13 is a diagram illustrating an example of a look-up table when 16 QAM is used;

FIG. 14 is a diagram illustrating an example of asymmetric symbol mapping when 256 QAM is used;

FIG. 15 is a diagram illustrating an example of a look-up table when 256 QAM is used;

FIG. 17 is a diagram illustrating an example of a look-up table of a PS inverse converter.

DESCRIPTION OF EMBODIMENTS

In the case where an error correction code is used in combination with PS, in a process of receiving frames, after error correction is executed on values of bit strings, normal values of the bit strings that have been obtained by the error correction are to be returned to the values before conversion of the PS. Therefore, in a process of transmitting frames, the conversion process of the PS is to be executed in accordance with the order of the frames received in the reception process before the generation of the error correction code.

Therefore, a quadrant of a symbol to be allocated may not be determined based on the error correction code in the conversion process of the PS, and only values of other bit strings not including a parity bit are converted based on predetermined association relationships between values before and after the conversion. When symbol mapping (hereinafter referred to as "symmetric symbol mapping") that causes values of bit strings corresponding to symbols within quadrants adjacent each other in a constellation to be symmetric with respect to a line between the quadrants is executed, the values of the bit strings after conversion are distributed symmetrically with respect to the line between the quadrants. Therefore, a distribution in which the probability of mapping a symbol is higher toward the center of the constellation may be formed.

However, when symbol mapping (hereinafter referred to as "asymmetric symbol mapping") that does not cause values of bit strings corresponding to symbols within quadrants adjacent to each other in a constellation to be symmetric with respect to a line between the quadrants is executed, the values of the bit strings after conversion are not distributed symmetrically with respect to the line between the quadrants. Therefore, a distribution in which the probability of mapping a symbol is higher toward the center of the constellation may not be formed and the PS may not be achieved.

An example of embodiments related to a technique for achieving probabilistic shaping in which asymmetric symbol mapping is executed is described with reference to the drawings.

Optical Transmission System

Figure 1:
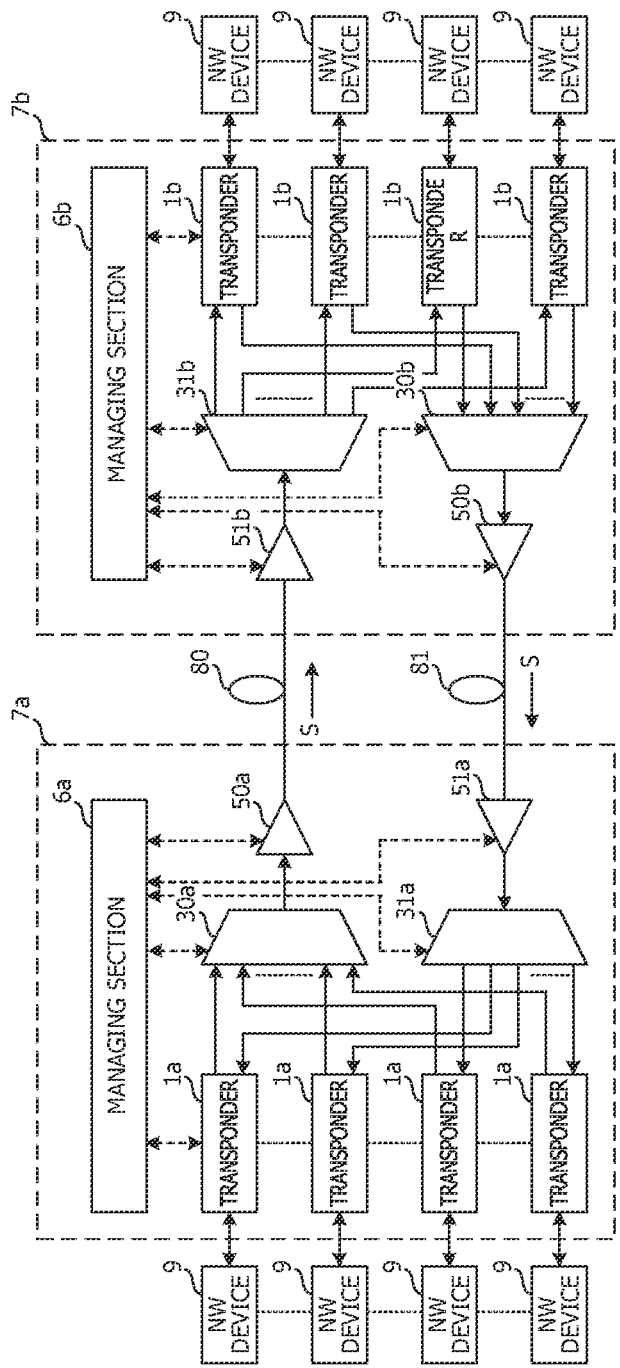
FIG. 1 is a configuration diagram illustrating an example of an optical transmission system.

FIG. 1 is a configuration diagram illustrating an example of an optical transmission system. The optical transmission system includes a pair of wavelength-multiplexed light transmitting devices 7a and 7b coupled to each other via transmission paths 80 and 81 that are optical fibers or the like. Each of the wavelength-multiplexed light transmitting devices 7a and 7b transmits and receives, to and from the other wavelength-multiplexed light transmitting device, a wavelength-multiplexed optical signal S obtained by wavelength-multiplexing a plurality of optical signals with different wavelengths.

The wavelength-multiplexed light transmitting device 7a includes a plurality of transponders 1a, an optical multiplexer 30a, an optical demultiplexer 31a, optical amplifiers 50a and 51a, and a managing section 6a. The wavelength-multiplexed light transmitting device 7b includes a plurality of transponders 1b, an optical multiplexer 30b, an optical demultiplexer 31b, optical amplifiers 50b and 51b, and a managing section 6b.

The transponders 1a and 1b transmit and receive optical signals. The optical signals are in an OTUCn frame format defined by ITU-T Recommendation G.709 as an example.

The transponders 1a and 1b are coupled to network (NW) devices 9 that are routers installed on a client network side or the like. The transponders 1a and 1b transmit and receive a plurality of client signals to and from the network devices 9. The transponders 1a and 1b cause a plurality of client signals from the network devices 9 to be stored in common frames. The transponders 1a and 1b output the frames to the optical multiplexers 30a and 30b. The transponders 1a and 1b extract a plurality of client signals from frames received from the optical demultiplexers 31a and 31b and transmit the client signals to the network devices 9.

The optical multiplexers 30a and 30b are, for example, optical selection switches or optical filters. The optical multiplexers 30a and 30b wavelength-multiplex optical signals input from the transponders 1a and 1b to generate wavelength-multiplexed optical signals and output the wavelength-multiplexed optical signals to the optical amplifiers 50a and 50b. The optical amplifiers 50a and 50b amplify the wavelength-multiplexed optical signals and output the amplified wavelength-multiplexed optical signals to the transmission paths 80 and 81.

The wavelength-multiplexed optical signals are input from the transmission paths 81 and 80 to the optical amplifiers 51a and 51b. The optical amplifiers 51a and 51b amplify the wavelength-multiplexed optical signals and output the amplified wavelength-multiplexed optical signals to the optical demultiplexers 31a and 31b.

The optical demultiplexers 31a and 31b are, for example, optical selection switches or optical filters and demultiplex the wavelength-multiplexed optical signals into optical signals with different wavelengths. The optical signals are input from the optical demultiplexers 31a and 31b to the transponders 1a and 1b.

The managing sections 6a and 6b are, for example, circuits with processors, such as central processing units (CPUs), and control the wavelength-multiplexed light transmitting devices 7a and 7b. The managing sections 6a and 6b set gains in the optical amplifiers 50a and 50b and set frames to be wavelength-multiplexed in the optical multiplexers 30a and 30b, for example. The managing sections 6a and 6b set the optical signals to be demultiplexed in the optical demultiplexers 31a and 31b and configure, in the transponders 1a and 1b, settings related to the storage of the client signals within the frames, for example.

Transponders

Figure 2:
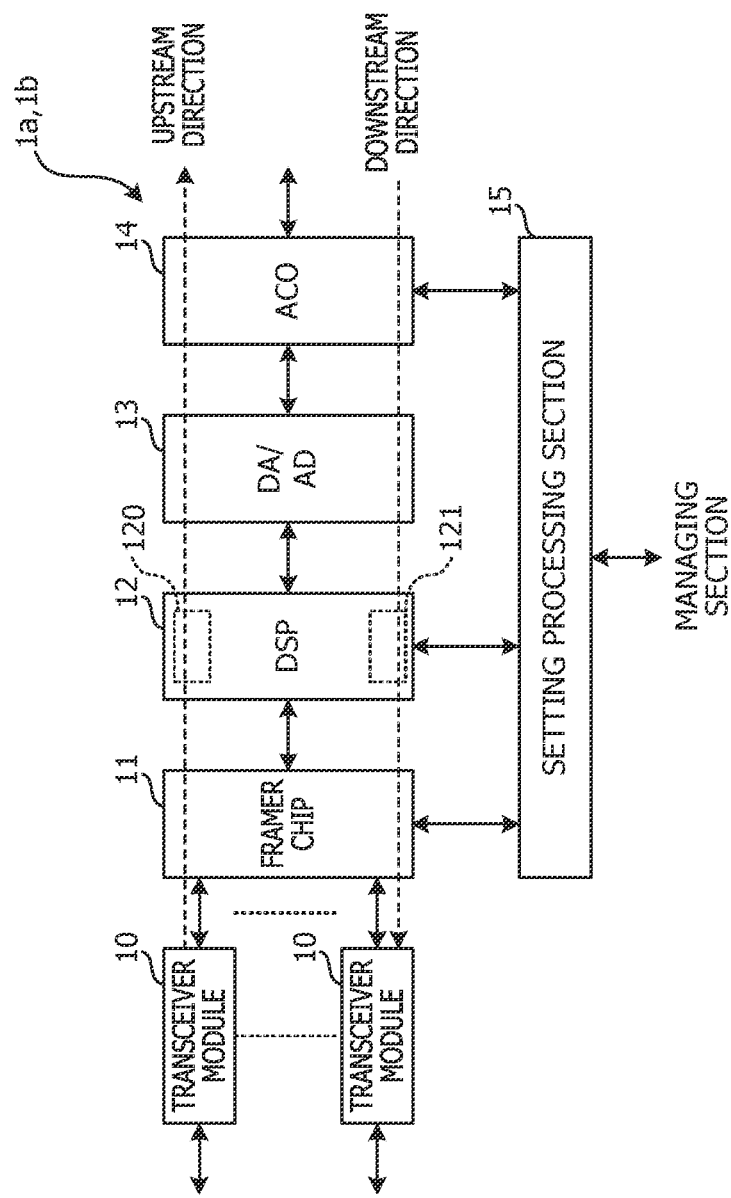
FIG. 2 is a configuration diagram illustrating an example of transponders.

FIG. 2 is a configuration diagram illustrating an example of the transponders 1a and 1b. Each of the transponders 1a and 1b includes a plurality of transceiver modules 10, a framer chip 11, a digital signal processor (DSP) 12, an analog-digital converter (DA/AD) 13, analog coherent optics (ACO) 14, and a setting processing section 15.

The transceiver modules 10 are optical modules attachable and detachable via, for example, electric couplers to and from a circuit board having the framer chip 11 mounted thereon. The transceiver modules 10 transmit and receive client signals to and from a network device 9. Examples of a frame format of each of the client signals are a synchronous optical network (SONET) frame and a GigabitEthernet (GbE) (registered trademark) frame. The frame format, however, is not limited to this.

First, a process to be executed in an upstream direction from the transceiver modules 10 to the ACO 14 is described.

The transceiver modules 10 convert client signals received from the network device 9 from optical signals to electric signals and output the converted client signals to the framer chip 11. The framer chip 11 causes the client signals input from the transceiver modules 10 to be stored in a frame. In this example, an example of the frame is an OTUCn frame. The frame, however, is not limited to this. Another frame may be used.

The framer chip 11 outputs the frame to the DSP 12. The DSP 12 generates an error correction code for the frame, modulates the frame via multilevel modulation, and outputs the modulated frame to the analog-digital converter 13. The analog-digital converter 13 converts the frame from a digital signal to an analog signal and outputs the frame to the ACO 14. The ACO 14 converts the frame from the electric signal to an optical signal and outputs the frame to the optical multiplexers 30a and 30b.

Next, a process to be executed in a downstream direction from the ACO 14 to the transceiver modules 10 is described.

The ACO 14 receives optical signals from the optical demultiplexers 31a and 31b, converts the optical signals into electric signals, and outputs the electric signals to the analog-digital converter 13. The analog-digital converter 13 converts the electric signals from analog signals to digital signals and outputs the electric signals to the DSP 12. The DSP 12 demodulates the electric signals to reproduce a frame, corrects an error, and outputs the frame to the framer chip 11.

The framer chip 11 extracts client signals from the frame and outputs the client signals to the transceiver modules 10. The transceiver modules 10 convert the client signals from electric signals to optical signals and output the client signals to the network device 9.

The setting processing section 15 configures various settings in the framer chip 11, the DSP 12, and the ACO 14 in accordance with instructions of the managing sections 6a and 6b.

The DSP 12 includes an encoding circuit 120 and a decoding circuit 121. The encoding circuit 120 encodes a plurality of bit strings within an upstream frame. The decoding circuit 121 decodes a plurality of bit strings within a downstream frame. Each of the bit strings is an example of bit values obtained by executing parallel conversion on serial data of a frame.

Comparative Example

Figure 3:
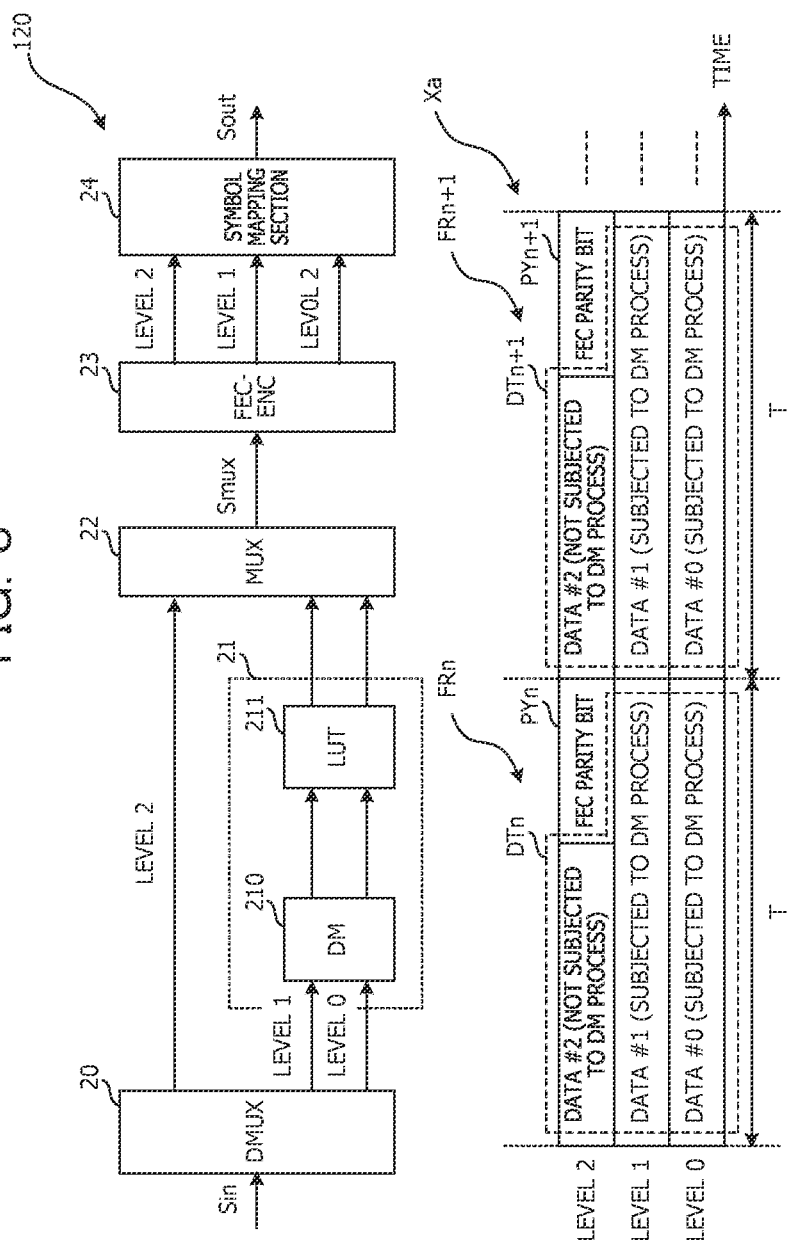
FIG. 3 is a configuration diagram illustrating an encoding circuit according to a comparative example.

FIG. 3 is a configuration diagram illustrating an encoding circuit 120 according to a comparative example. The encoding circuit 120 includes a demultiplexer (DMUX) 20, a PS converter 21, a multiplexer (MUX) 22, an FEC encoder (FEC-ENC) 23, and a symbol mapping section 24. The PS converter 21 includes a DM processing section 210 and a look-up table (LUT) 211. In this example, 64 QAM is used as multilevel modulation, but the multilevel modulation is not limited to this.

First, an example of the configuration of a frame is described. A reference sign Xa indicates details of bit strings within frames FRn and FRn+1 continuously input to the symbol mapping section 24. The abscissa indicates time. Each of the frames FRn and FRn+1 has a fixed cycle T and includes parallel bit strings of levels 0 to 2. The bit string of the level 2 represents the most significant bit (MSB), while the bit string of the level 0 represents the least significant bit (LSB). The bit string of the level 2 is an example of a predetermined bit string.

The bit strings of the levels 0 to 2 include data #0 to #2 of a client signal. The data #0 and #1 is already subjected to the DM process by the DM processing section 210, while the data #2 is not subjected to the DM process.

A parity bit generated by the FEC encoder 23 is inserted in the bit string of the level 2. For the frame FRn, the FEC encoder 23 generates an FEC parity bit PYn in a process of encoding a data region DTn including the data #0 to #2 and adds the generated FEC parity bit PYn to the end of the data #2. For the frame FRn+1, the FEC encoder 23 generates an FEC parity bit PYn+1 in a process of encoding a data region DTn+1 including the data #0 to #2 and adds the generated FEC parity bit PYn+1 to the end of the data #2.

Operations of the encoding circuit 120 are described below. A frame signal Sin is input from the framer chip 11 to the demultiplexer 20. The frame signal Sin is a serial bit string. The demultiplexer 20 executes serial-to-parallel conversion on the frame signal Sin to demultiplex the frame signal Sin into the bit strings of the levels 0 to 2.

The bit strings of the levels 0 to 2 are transmitted via individual lanes. The bit string of the level 2 is input to the multiplexer 22. The bit strings of the levels 0 and 1 are input to the multiplexer 22 via the PS converter 21.

The PS converter 21 executes PS to form a probability distribution for symbol mapping to be executed by the symbol mapping section 24 on the bit strings of the levels 0 to 2. The DM processing section 210 executes the DM process on the bit strings of the levels 0 and 1. The DM process increases mark rates of the bit strings of the levels 0 and 1 to rates (of, for example, 80%) of greater than 50% so that the number of values "1" of each of the bit strings of the levels 0 and 1 is larger than the number of values "0" of each of the bit strings of the levels 0 and 1. Therefore, a distribution of the values of the bit strings is biased. Contrary to this example, the mark rates may be reduced to rates lower than 50% by the DM process.

The bit strings subjected to the DM process are input to the LUT 211. The values of the bit strings are converted by the LUT 211. Therefore, the bit values are converted so that the probability of mapping a symbol is higher toward the center of the constellation in each of the first to fourth quadrants into which the constellation is partitioned. The bit strings after the conversion are input to the multiplexer 22. The LUT 211 may be composed of a memory circuit or the like, for example.

The multiplexer 22 multiplexes the bit strings of the levels 0 to 2 and outputs the multiplexed bit strings of the levels 0 to 2 to the FEC encoder 23.

The FEC encoder 23 synchronizes with the cycles T of the frames and encodes the data #0 to #2 of the bit strings to generate an FEC parity bit for each of the frames. The FEC encoder 23 inserts the parity bit in the bit string of the level 2. The parity bit is an example of an error correction code and is used by the decoding circuit 121 to execute error correction on the data #0 to #2. The FEC encoder 23 outputs the encoded bit strings of the levels 0 to 2 to the symbol mapping section 24.

The symbol mapping section 24 allocates, to the bit strings, a symbol that is among a plurality of symbols within a 64-QAM constellation and corresponds to values of the bit strings of the levels 0 to 2. The symbol mapping section 24 outputs an output signal Sout corresponding to the allocated symbol to the analog-digital converter 13. In the foregoing manner, the decoding circuit 121 operates.

Figure 4:
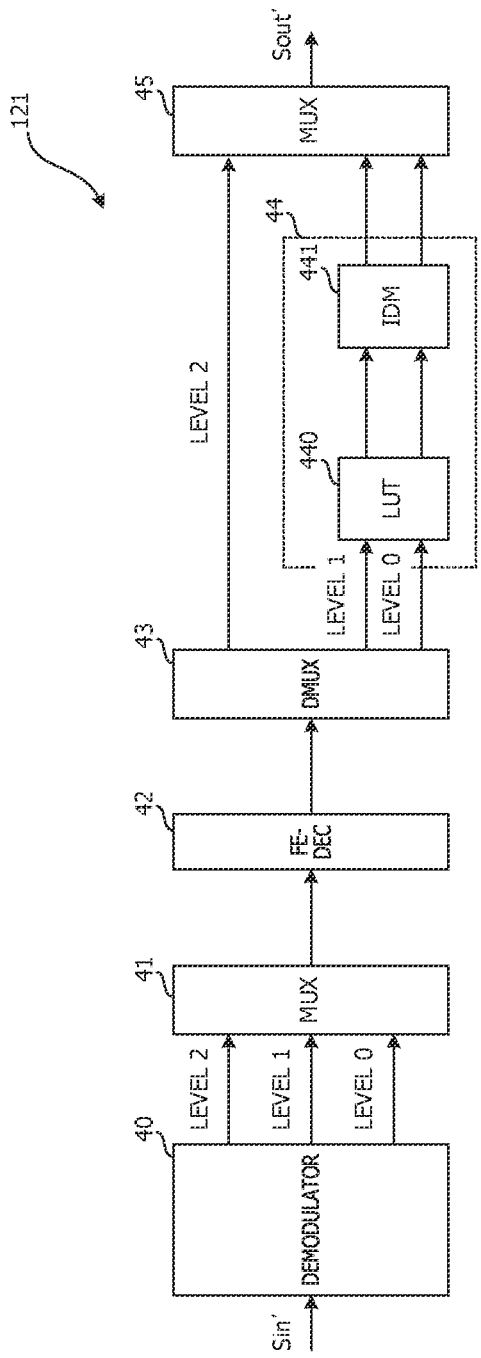
FIG. 4 is a configuration diagram illustrating a decoding circuit according to the comparative example.

FIG. 4 is a configuration diagram illustrating a decoding circuit 121 according to the comparative example. The decoding circuit 121 includes a demodulator 40, a multiplexer (MUX) 41, an FEC decoder (FEC-DEC) 42, a demultiplexer (DMUX) 43, a PS inverse converter 44, and a multiplexer (MUX) 45. The PS inverse converter 44 includes an LUT 440 and an inverse distribution matching (IDM) processing section 441.

The demodulator 40 determines the values of the bit strings of the levels 0 to 2 based on an input signal Sin' input from the analog-digital converter 13. The demodulator 40 determines the certainty or likelihood of values "0" and "1" of the bit strings based on the symbol indicated in the input signal Sin'. The bit strings of the levels 0 to 2 are transmitted as a log-likelihood ratio (LLR) to individual lanes. The demodulator 40 outputs the values of the bit strings of the levels 0 to 2 to the multiplexer 41.

The multiplexer 41 multiplexes the bit strings of the levels 0 to 2 and outputs the multiplexed bit strings of the levels 0 to 2 to the FEC decoder 42.

The FEC decoder 42 corrects an error of the results of the determination based on the parity bit inserted in the bit string of the level 2. The FEC decoder 42 synchronizes with the cycles T of the frames and extracts the FEC parity bit from the bit string of the level 2. The FEC decoder 42 decodes the data #0 to #2 of the bit strings based on the parity bit, thereby executing error correction on each of the bit strings. The FEC decoder 42 outputs the bit strings subjected to the error correction to the demultiplexer 43.

The demultiplexer 43 demultiplexes the signal input from the FEC decoder 42 into the bit strings of the levels 0 to 2. The bit string of the level 2 is input to the multiplexer 45. The bit strings of the levels 0 and 1 are input to the multiplexer 45 via the PS inverse converter 44.

The PS inverse converter 44 executes inverse conversion on each of the bit strings of the levels 0 to 2. The inverse conversion is the reverse of the conversion by the PS converter 21. For example, the PS inverse converter 44 inversely converts the values of the bit strings of the levels 0 and 1 that have been converted so that, as a region within the constellation is closer to the center of the constellation, the number of symbols allocated in the region is larger. The values of the bit strings of the levels 0 and 1 are converted by the LUT 440. The conversion restores the values of the bit strings to the values before the conversion by the LUT 211 of the encoding circuit 120. The LUT 440 is composed of a memory circuit or the like, for example.

The IDM processing section 441 executes an inverse DM process on each of the bit strings of the levels 0 and 1. The inverse-DM process is the reverse of the DM process by the DM processing section 210. The inverse DM process restores the bit strings of the levels 0 and 1 to the values before the conversion by the DM processing section 210.

The multiplexer 45 multiplexes the bit strings of the levels 0 to 2 and outputs the multiplexed bit strings of the levels 0 to 2 as an output signal Sout' to the framer chip 11. In the foregoing manner, the decoding process is executed.

A PS process is described below.

FIG. 5 is a diagram illustrating an example of the PS process. In this example, a 16-QAM constellation is exemplified for convenience of explanation. In a constellation, symbols P11 to P14, P21 to P24, P31 to P34, and P41 to P44, which are signal points, are arranged evenly in first to fourth quadrants.

The sizes of circles indicating the symbols P11 to P14, P21 to P24, P31 to P34, and P41 to P44 indicate values of probabilities of mapping the symbols. The probabilities of mapping the symbols P11 to P14, P21 to P24, P31 to P34, and P41 to P44 before the PS are equal to each other.

As the symbols P11 to P14, P21 to P24, P31 to P34, and P41 to P44 are closer to a central point O of the constellation, the probabilities of mapping the symbols after the PS are higher. For example, the probabilities of mapping the symbols P22, P23, P32, and P33 of which distances from the central point O are the shortest are the highest, while the probabilities of mapping the symbols P11, P14, P41, and P44 of which distances from the central point O are the longest are the lowest.

In the generation of the probability distribution for the symbol mapping, the values of each of the bit strings of the levels 0 and 1 are converted so that the probabilities of allocating the symbols P22, P23, P32, and P33 arranged close to the central point O are high, and the quadrants of the symbols P11 to P14, P21 to P24, P31 to P34, and P41 to P44 are determined based on the values of the bit string of the level 2.

FIG. 6 is a diagram illustrating an example of symmetric symbol mapping. In the symbol mapping, a symbol that is among a plurality of symbols (refer to "circles" within cells) arranged in vertical and horizontal directions along I and Q axes orthogonal to each other at the center O of the constellation and corresponds to a combination of the values of the bit strings is allocated.

In this example, the symbol mapping section 24 maps the bit strings of the levels 0 to 2 to the symbols by executing gray code mapping. The gray code mapping is used when an encoding method using an error correction code is bit-interleaved coded modulation (BICM), for example.

The symbol mapping section 24 determines a symbol to be allocated, based on I and Q values arrayed as gray codes. The symbol mapping section 24 uses values of the bit strings of the levels 0 to 2 as the I and Q values. For example, when the values of the bit strings of the levels 0 to 2 serve as the I values and are "1", "0", and "0", and the values of the bit strings of the levels 0 to 2 serve as the Q values and are "1", "0", and "1", a symbol indicated by a sign W is allocated. The arrangement of the I values corresponding to symbols in the I-axis direction is the same as the arrangement of the Q values corresponding to symbols in the Q-axis direction.

For example, the symbol mapping section 24 may allocate the same value of each of the bit strings of the levels 0 to 2 to both I and Q values of each of the bit strings of the levels 0 to 2. For example, when the values of the bit strings of the levels 0 to 2 are "1", "1", and "1", the I values of the bit strings of the levels 0 to 2 are "1", "1", and "1" and the Q values of the bit strings of the levels 0 to 2 are "1", "1", and "1".

The symbol mapping section 24 may alternately allocate the values of the bit strings of the levels 0 to 2 to the I and Q values. For example, when values of the bit strings of the levels 0 to 2 are for continuous 2 bits and are "1", "0", and "1", and "0", "1", and "0", the I values are "1", "0", and "1" and the Q values are "0", "1", and "0".

Based on the I and Q values of the bit string of the level 2, the symbol mapping section 24 determines a quadrant of a symbol to be allocated. When the I value is "0" and the Q value is "0", a symbol within the first quadrant is allocated. When the I value is "1" and the Q value is "0", a symbol within the second quadrant is allocated. When the I value is "1" and the Q value is "1", a symbol within the third quadrant is allocated. When the I value is "0" and the Q value is "0", a symbol within the fourth quadrant is allocated.

In the foregoing manner, the symbol mapping section 24 determines, based on the value of the bit string of the level 2, a quadrant in which a symbol to be allocated is located and that is among the first to fourth quadrants into which the constellation is partitioned.

The FEC encoder 23 disposed on the downstream side of the PS converter 21 inserts the parity bit in the bit string of the level 2. Therefore, the PS converter 21 may not determine a quadrant of a symbol to be allocated and determines the position of a symbol within each of the quadrants based on only the values of the bit strings of the other levels 0 and 1.

After the PS converter 21 causes the DM processing section 210 to bias a distribution of the values of the bit strings of the levels 0 and 1, the PS converter 21 causes the LUT 211 to convert the values of the bit strings of the levels 0 and 1 so that, as a region within the constellation is closer to the center O of the constellation, the probability of mapping a symbol in the region is larger.

In the gray code mapping, values that are included in the bit strings of the levels 0 and 1 and correspond to symbols within the first and second quadrants adjacent to each other in the constellation, and values that are included in the bit strings of the levels 0 and 1 and correspond to symbols within the third and fourth quadrants adjacent to each other in the constellation are symmetric with respect to a line between the first and second quadrants and the third and fourth quadrants. For example, the values that are included in the bit strings of the levels 0 and 1 and correspond to the symbols located symmetrically with respect to the I axis are the same, while the values that are included in the bit strings of the levels 0 and 1 and correspond to the symbols located symmetrically with respect to the Q axis are the same. The gray code mapping is an example of the symmetric symbol mapping.

Figure 7:
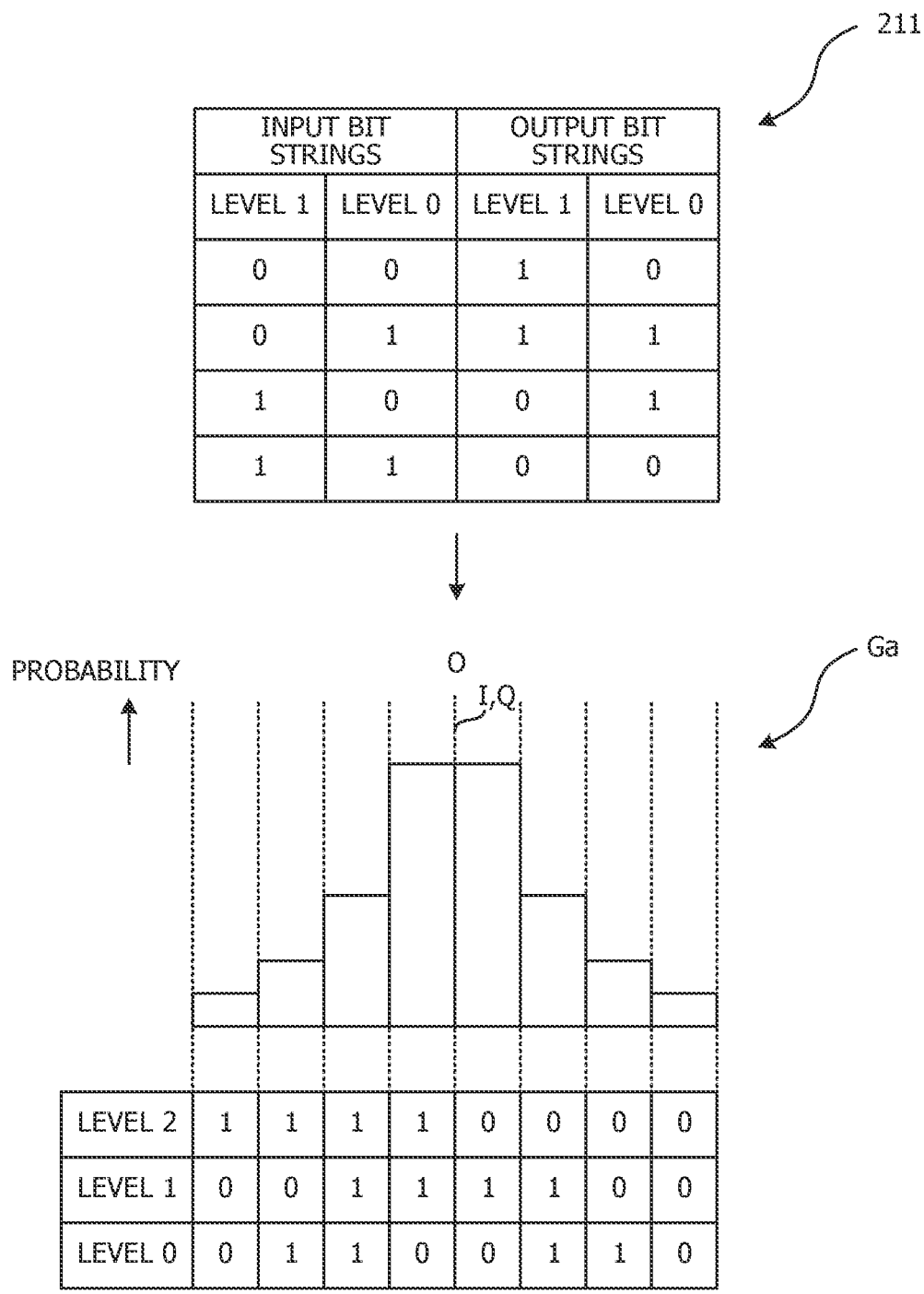
FIG. 7 is a diagram illustrating an example of formation of a probability distribution for symbol mapping by conversion of values of bit strings.

FIG. 7 is a diagram illustrating an example of formation of a probability distribution for symbol mapping by conversion of values of bit strings. In the LUT 211, values before and after the conversion, for example, values of input bit strings input from the DM processing section 210 and values of output bit strings to be output to the multiplexer 22 are associated and registered. For example, when the values of the input bit strings of the levels 0 and 1 are "0" and "0", the values of the output bit strings are "1" and "0".

The values of the input bit strings represent a 2-bit unsigned integer (0, 1, 2, or 3 in this example) and correspond to an amplitude within the constellation. The values "0" and "0" of the input bit strings indicate a symbol having the minimum amplitude and located at the innermost position within the constellation. The values "1" and "1" of the input bit strings indicate a symbol having the maximum amplitude and located at the outermost position within the constellation.

A reference sign Ga indicates an example of a probability distribution for symbol mapping in the constellation based on the I values or the Q values. For example, it is assumed that the DM processing section 210 biases the values of the input bit strings so that the probability of the values "0" and "0" of the bit strings of the levels 1 and 0 is the highest, the probability of the values "0" and "1" of the bit strings of the levels 1 and 0 is the second highest, the probability of the values "1" and "0" of the bit strings of the levels 1 and 0 is the third highest, and the probability of the values "1" and "1" of the bit strings of the levels 1 and 0 is the lowest. In this case, the probability of the values "1" and "0" of the output bit strings of the levels 1 and 0 is the highest, the probability of the values "1" and "1" of the output bit strings of the levels 1 and 0 is the second highest, the probability of the values "0" and "1" of the output bit strings of the levels 1 and 0 is the third highest, and the probability of the values "0" and "0" of the output bit strings of the levels 1 and 0 is the lowest.

Since the gray code mapping is symmetric symbol mapping, the values of the bit strings of the levels 1 and 0 are symmetric with respect to the I axis extending through the center O and are symmetric with respect to the Q axis extending through the center O. Therefore, as a region within the constellation is closer to the center O of the constellation, the probability of mapping a symbol in the region is higher.

On the other hand, when the symbol mapping section 24 executes asymmetric symbol mapping, the LUT 211 may not form such a probability distribution as described above.

FIG. 8 is a diagram illustrating an example of the asymmetric symbol mapping. In this example, the symbol mapping section 24 maps the bit strings of the levels 0 to 2 to symbols (refer to "circles" within cells) by executing set partitioning. The set partitioning is used when an encoding method using an error correction code is multilevel coding (MLC), for example.

The symbol mapping section 24 determines a symbol to be allocated, based on the I and Q values arrayed in accordance with the set partitioning. The arrangement of the I values corresponding to symbols in the I-axis direction is the same as the arrangement of the Q values corresponding to symbols in the Q-axis direction.

The arrangement of the values of the bit strings of the levels 0 and 1 in the set partitioning is different from the arrangement of the values of the bit strings of the levels 0 and 1 in the gray code mapping. In the set partitioning, values that are included in the bit strings of the levels 0 and 1 and correspond to symbols within the first and second quadrants adjacent to each other in the constellation, and values that are included in the bit strings of the levels 0 and 1 and correspond to symbols within the third and fourth quadrants adjacent to each other in the constellation are not symmetric with respect to the line between the first and second quadrants and the third and fourth quadrants. For example, the values that are included in the bit strings of the levels 0 and 1 and correspond to the symbols located symmetrically with respect to the I axis are different, while the values that are included in the bit strings of the levels 0 and 1 and correspond to the symbols located symmetrically with respect to the Q axis are different. The set partitioning is an example of the asymmetric symbol mapping.

The asymmetric symbol mapping may not be executed so that, as a region within the constellation is closer to the center O of the constellation, the probability of mapping a symbol in the region is higher, as described below.

Figure 9:
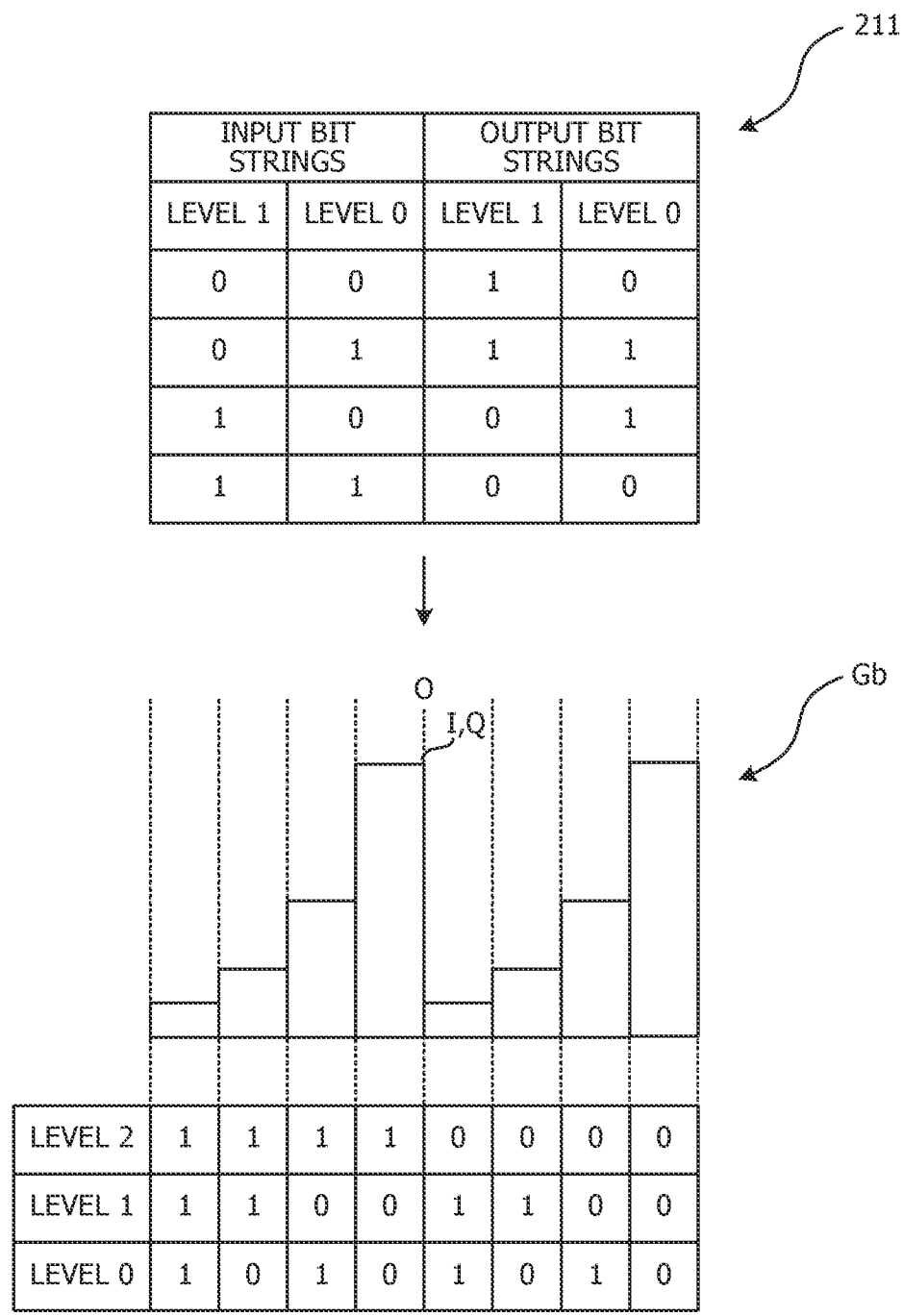
FIG. 9 is a diagram illustrating another example of the formation of the probability distribution for the symbol mapping by the conversion of the values of the bit strings.

FIG. 9 is a diagram illustrating another example of the formation of the probability distribution for the symbol mapping by the conversion of the values of the bit strings. The LUT 211 is the same as that illustrated in FIG. 7.

A reference sign Gb indicates an example of a distribution of probabilities of mapping symbols in the constellation based on the I values or the Q values. For example, it is assumed that the DM processing section 210 biases the values of the input bit strings so that the probability of the values "1" and "1" of the bit strings of the levels 1 and 0 is the highest, the probability of the values "1" and "0" of the bit strings of the levels 1 and 0 is the second highest, the probability of the values "0" and "0" of the bit strings of the levels 1 and 0 is the third highest, and the probability of the values "0" and "1" of the bit strings of the levels 1 and 0 is the lowest. In this case, the probability of the values "0" and "0" of the output bit strings of the levels 1 and 0 is the highest, the probability of the values "0" and "1" of the output bit strings of the levels 1 and 0 is the second highest, and the probability of the values "1" and "0" of the output bit strings of the levels 1 and 0 is the third highest, and the probability of the values "1" and "1" of the output bit strings of the levels 1 and 0 is the lowest.

Since the set partitioning is the asymmetric symbol mapping, the values of the bit strings of the levels 1 and 0 are not symmetric with respect to the I and Q axes. Therefore, as a region within the constellation is closer to the center O of the constellation, the probability of mapping a symbol in the region is higher in each of quadrants located on one of the sides between which the I axis extends. However, as a region within the constellation is closer to the center O of the constellation, the probability of mapping a symbol in the region is lower in each of the other quadrants located on the other of the sides between which the I axis extends. As a region within the constellation is closer to the center O of the constellation, the probability of mapping a symbol in the region is higher in each of quadrants located on one of the sides between which the Q axis extends. However, as a region within the constellation is closer to the center O of the constellation, the probability of mapping a symbol in the region is lower in each of the other quadrants located on the other of the sides between which the Q axis extends.

Therefore, according to the configuration described in the comparative example, it is not possible to achieve probabilistic shaping in which asymmetric symbol mapping is executed.

First Embodiment

On the other hand, an encoding circuit 120 according to a first embodiment switches association relationships between input bit strings and output bit strings within an LUT based on a value of a bit string of a level 2, while the bit string of the level 2 is included in a preceding frame and has a determined parity bit inserted therein. The encoding circuit 120 may cause the association relationships between the input bit strings and the output bit strings to vary for each of quadrants within a constellation based on the determined value of the bit string of the level 2. Therefore, as a region within the constellation is closer to the center O of the constellation, the probability of mapping a symbol in the region may be higher.

Figure 10:
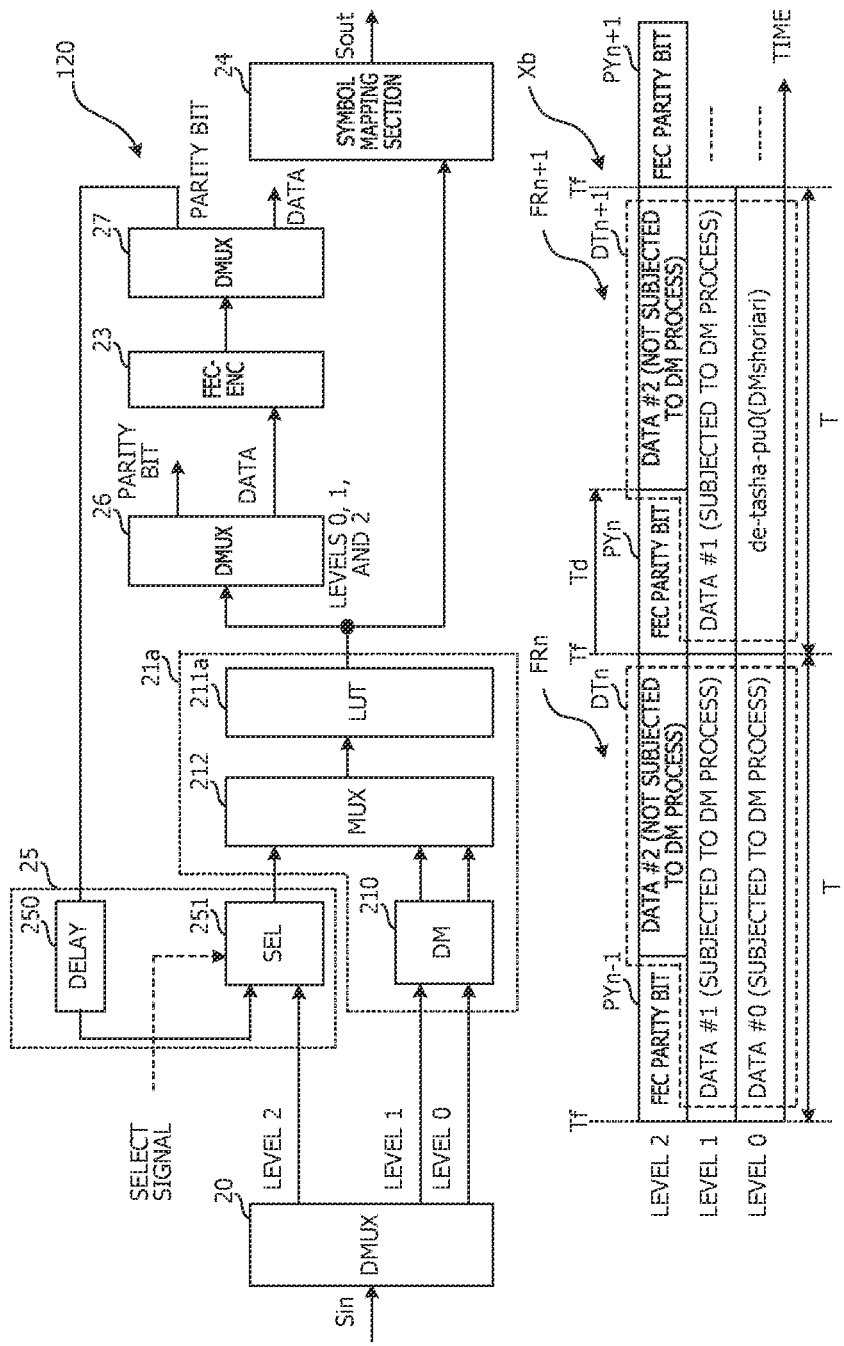
FIG. 10 is a configuration diagram illustrating an encoding circuit according to a first embodiment.

FIG. 10 is a configuration diagram illustrating the encoding circuit 120 according to the first embodiment. Configurations illustrated in FIG. 10 and common to those illustrated in FIG. 3 are indicated by the same reference signs as those illustrated in FIG. 3 and will not be described. The encoding circuit 120 executes an encoding method according to the first embodiment.

The encoding circuit 120 includes demultiplexers 20, 26, and 27, a PS converter 21a, an FEC encoder 23, a parity bit inserting circuit 25, and a symbol mapping section 24. The PS converter 21a includes a DM processing section 210, an LUT 211a, and a multiplexer 212. The parity bit inserting circuit 25 includes a delay generator (DELAY) 250 and a selector (SEL) 251. In this example, 64 QAM is used as multilevel modulation, but the multilevel modulation is not limited to this.

First, an example of the configuration of a frame is described. A reference sign Xb indicates details of bit strings of frames FRn and FRn+1 that are continuously input to the symbol mapping section 24. The abscissa indicates time. The bit strings of levels 0 to 2 include data #0 to #2 of a client signal, like the bit strings described in the comparative example. The data #0 and #1 is already subjected to the DM process by the DM processing section 210, while the data #2 is not subjected to the DM process.

A parity bit generated by the FEC encoder 23 is inserted in the bit string of the level 2. A parity bit PYn is not inserted in the frame FRn that includes the data #0 to #2 from which the parity bit PYn has been generated, unlike the comparative example. The parity bit PYn is inserted in the bit string of the level 2 within a frame FRn+1 succeeding the frame FRn. Therefore, a delay time Td corresponding to a data amount of the parity bit PYn is given to the parity bit PYn.

In the same manner described above, a parity bit PYn−1 generated from the data #0 to #2 of another frame FRn−1 preceding the frame FRn is inserted in the bit string of the level 2 within the frame FRn, and a parity bit PYn+1 generated from the data #0 to #2 of the frame FRn+1 is inserted in the bit string of the level 2 within a frame succeeding the frame FRn+1.

In the foregoing manner, the parity bits PYn−1, PYn, and PYn+1 are delayed. The parity bit PYn−1 is inserted in the bit string of the level 2 within the frame FRn, the parity bit PYn is inserted in the bit string of the level 2 within the frame FRn+1, and the parity bit PYn+1 is inserted in the bit string of the level 2 within the frame succeeding the frame FRn+1. Thus, the PS converter 21a disposed on the upstream side of the FEC encoder 23 may identify, based on a determined parity bit, a quadrant in which a symbol to be allocated is located.

Operations of the encoding circuit 120 are described below. The bit strings of the levels 0 and 1 are input to the DM processing section 210 from the demultiplexer 20. The DM processing section 210 biases a distribution of values of the bit strings. The bit strings are input to the multiplexer 212.

The bit string of the level 2 is input to the multiplexer 212 via the parity bit inserting circuit 25.

The parity bit inserting circuit 25 is an example of an inserting circuit and delays a parity bit and inserts the parity bit in the bit string of the level 2 within a frame succeeding a frame from which the parity bit has been generated. The bit string of the level 2 is input to the selector 251 within the parity bit inserting circuit 25.

The selector 251 selects data to be output to the multiplexer 212 from the bit string of the level 2 and the parity bit in accordance with a select signal from the setting processing section 15. The parity bit is input to the selector 251 from the FEC encoder 23 via the delay generator 250. The delay generator 250 is, for example, a buffer circuit and delays the parity bit by the time Td and outputs the parity bit to the selector 251.

The select signal gives an instruction to select the output data in accordance with time. Therefore, the selector 251 selects the parity bit at a time Tf corresponding to the top of the frame, and selects the bit string from the demultiplexer 20, for example, the data #2 at a time (Tf+Td). Therefore, as indicated by a reference sign Xb, the parity bit is inserted in the succeeding frame. In this example, the parity bit is inserted in the frame immediately succeeding the frame from which the parity bit has been generated. The parity bit, however, may be inserted in any of frames succeeding the frame from which the parity bit has been generated.

The multiplexer 212 multiplexes the bit strings of the levels 0 to 2 and outputs the multiplexed bit strings of the levels 0 to 2 to the LUT 211a.

The LUT 211a converts values of the bit strings of the levels 0 and 1 so that, as a region within the constellation is closer to the center of the constellation, the number of symbols allocated in the region is larger. The LUT 211a switches the values of the bit strings of the levels 0 and 1 to values of the bit strings of the levels 0 and 1 after the conversion in accordance with the value of the bit string of the level 2. The LUT 211a is composed of a memory circuit or the like, for example.

Figure 11:
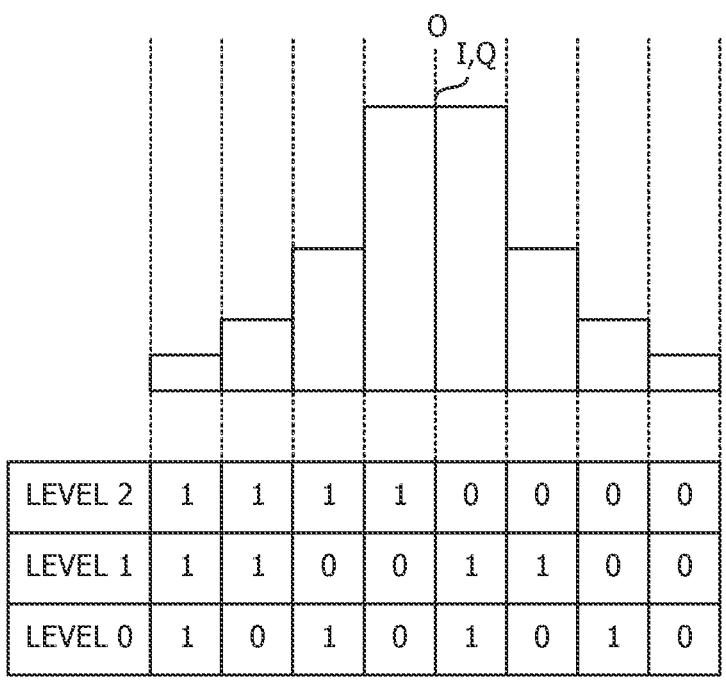
FIG. 11 is a diagram illustrating an example of formation of a probability distribution for symbol mapping by conversion of values of bit strings according to the first embodiment.

FIG. 11 is a diagram illustrating an example of formation of a probability distribution for symbol mapping by the conversion of the values of the bit strings according to the first embodiment. In the LUT 211a, the values before and after the conversion, for example, values of input bit strings input from the multiplexer 212 and values of output bit strings to be output to the symbol mapping section 24 are associated and registered.

In the LUT 211a, values of the bit string of the level 2 are registered as an input bit string and an output bit string, unlike the comparative example. Since the value of the bit string of the level 2 is not converted, the value of the input bit string is the same as the value of the output bit string.

The association relationships between the values of the bit strings of the levels 0 and 1 before and after the conversion are switched based on the value of the bit string of the level 2. For example, when the value of the bit string of the level 2 is "0", values "0" and "0" of the input bit strings of the levels 0 and 1 are associated with values "1" and "1" of the output bit strings of the levels 0 and 1. When the value of the bit string of the level 2 is "1", the values "0" and "0" of the input bit strings of the levels 0 and 1 are associated with values "0" and "0" of the output bit strings of the levels 0 and 1. For example, the values of the output bit strings that are associated with the values "0" and "0" of the input bit strings vary depending on the value of the bit string of the level 2.

The bit string of the level 2 is used to determine a quadrant of a symbol to be allocated by the symbol mapping section 24. Therefore, the LUT 211a may cause the association relationships between the values of the bit strings of the levels 0 and 1 before and after the conversion to vary for each of the quadrants. Even when the asymmetric symbol mapping is used, the PS converter 21a may cause the probability of mapping a symbol in a region within the constellation to be higher as the region is closer to the center O of the constellation, as described later.

A reference sign Gc indicates an example of a probability distribution for the symbol mapping in the constellation based on I values or Q values. In this example, the set partitioning illustrated in FIG. 8 is used as an example of the asymmetric symbol mapping. For example, it is assumed that the DM processing section 210 biases the values of the input bit strings so that the probability of the values "0" and "0" of the bit strings of the levels 1 and 0 is the highest, the probability of the values "0" and "1" of the bit strings of the levels 1 and 0 is the second highest, the probability of the values "1" and "0" of the bit strings of the levels 1 and 0 is the third highest, and the probability of the values "1" and "1" of the bit strings of the levels 1 and 0 is the lowest.

When the value of the bit string of the level 2 is "0", the probability of values "1" and "1" of the output bit string of the levels 0 and 1 is the highest, the probability of values "1" and "0" of the output bit string of the levels 0 and 1 is the second highest, the probability of values "0" and "1" of the output bit string of the levels 0 and 1 is the third highest, and the probability of values "0" and "0" of the output bit string of the levels 0 and 1 is the lowest. On the other hand, when the value of the bit string of the level 2 is "1", the probability of values "0" and "0" of the output bit string of the levels 0 and 1 is the highest, the probability of values "0" and "1" of the output bit string of the levels 0 and 1 is the second highest, the probability of values "1" and "0" of the output bit string of the levels 0 and 1 is the third highest, and the probability of values "1" and "1" of the output bit string of the levels 0 and 1 is the lowest.

The LUT 211a may cause the values of the bit strings of the levels 0 and 1 after the conversion to vary depending on the value of the bit string of the level 2, while the value of the bit string of the level 2 is used to determine a quadrant of a symbol to be allocated. Therefore, even when the PS converter 21a uses the asymmetric symbol mapping, the PS converter 21a may convert the values of the bit strings of the levels 0 and 1 so that, as a region within the constellation is closer to the center O of the constellation, the number of symbols allocated in the region is larger, unlike the comparative example illustrated in FIG. 9. The PS converter 21a is an example of a converter.

Refer to FIG. 10 again. The bit strings of the levels 0 to 2 are input to each of the demultiplexer 26 and the symbol mapping section 24.

The demultiplexer 26 removes the parity bit from the bit string of the level 2 and outputs the bit strings to the FEC encoder 23. Therefore, the inserted parity bit that is not used for the encoding is discarded.

The FEC encoder 23 is an example of a generator. The FEC encoder 23 generates a parity bit after the conversion of values of the bit strings of the levels 0 and 1. The FEC encoder 23 inserts the parity bit in the end of the data #2 of the bit string of the level 2. Since the FEC encoder 23 generates the parity bit after the conversion of the values of the bit strings of the levels 0 and 1, a decoding circuit 121 on a receiving side may normally execute an inverse DM process after executing error correction on each of the bit strings based on the parity bit.

An example of the encoding method is multilevel coding (MLC). However, other block coding, convolution coding, or the like may be used as the encoding method as long as the method separates the parity bit from the data #0 to #2. The FEC encoder 23 outputs the bit strings to the demultiplexer 27.

The demultiplexer 27 extracts the parity bit newly generated by the FEC encoder 23 from the bit string of the level 2 and outputs the parity bit to the delay generator 250 in order to insert the parity bit in a succeeding frame. The demultiplexer 27 discards the data #0 to #2 other than the parity bit.

The symbol mapping section 24 is an example of an allocator and allocates a symbol corresponding to the values of the bit strings to the bit strings. The symbol mapping section 24 executes the asymmetric symbol mapping, such as the set partitioning.

The symbol mapping section 24 allocates, to the bit strings, one symbol that is among symbols within a quadrant corresponding to the value of the bit string of the level 2 and corresponds to the values of the bit strings of the levels 0 and 1. The PS converter 21a switches the association relationships between the bit strings of the levels 0 and 1 before and after the conversion based on the value of the bit string of the level 2, as described above.

The values of the bit strings of the levels 0 and 1 are converted for each of the quadrants of the constellation based on the determined value of the bit string of the level 2. Therefore, as a region within the constellation is closer to the center O of the constellation, the probability of mapping a symbol in the region may be higher. Therefore, the encoding circuit 120 according to the first embodiment may achieve the PS using the asymmetric symbol mapping.

After the PS converter 21a causes the DM processing section 210 to bias a probability distribution of the values of the bit strings of the levels 0 and 1, the PS converter 21a converts the values of the bit strings based on the association relationships between the input bit strings and the output bit strings within the LUT 211a. Since the PS converter 21a has the separated functions that are the DM processing section 210 and the LUT 211a, the PS converter 21a is simplified, compared to the case where the PS converter 21a is configured as one function.

Example of Other Multilevel Modulation

In the foregoing example, 64 QAM is used as the multilevel modulation. The multilevel modulation is not limited to this. Another method may be used.

Figure 12:
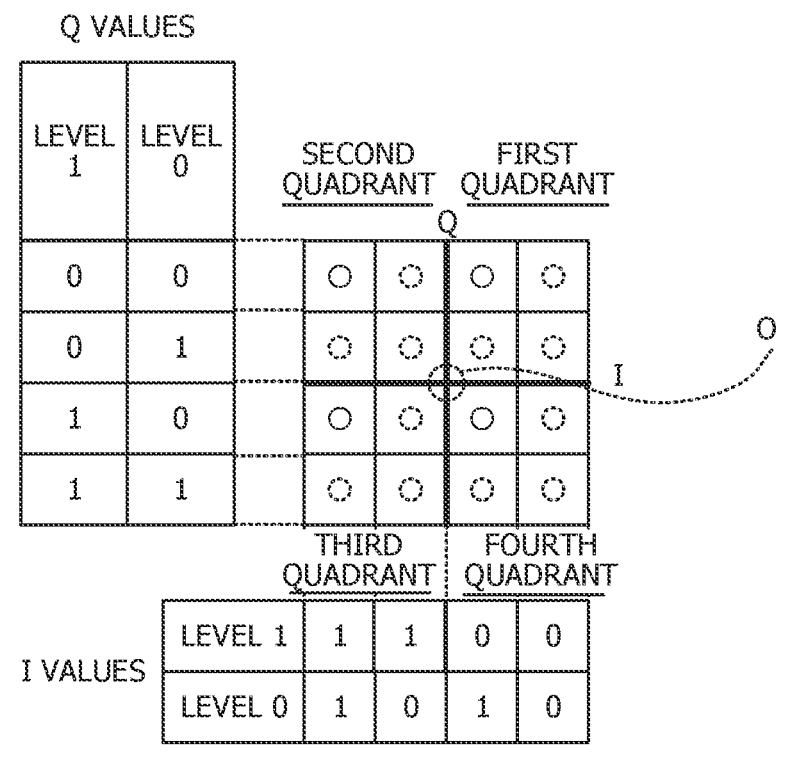

FIG. 12 is a diagram illustrating an example of asymmetric symbol mapping when 16 QAM is used. In this example, bit strings are of levels 0 and 1. The bit string of the level 1 is an example of the predetermined bit string and is used to determine a quadrant of a symbol to be allocated.

For example, when both I and Q values of the bit string of the level 1 are "1", a quadrant of a symbol to be allocated is the third quadrant. In this asymmetric symbol mapping, values that are included in the bit strings of the levels 0 and 1 and correspond to symbols within the first and second quadrants adjacent to each other in the constellation, and values that are included in the bit strings of the levels 0 and 1 and correspond to symbols within the third and fourth quadrants adjacent to each other in the constellation are not symmetric with respect to a line between the first and second quadrants and the third and fourth quadrants.

FIG. 13 is a diagram illustrating an example of the LUT 211a when 16 QAM is used. In the LUT 211a, association relationships between an input bit string of the level 0 and an output bit string of the level 0 are registered.

In the LUT 211a, an input bit string of the level 1 and an output bit string of the level 1 are registered. Although the value of the bit string of the level 1 is not converted, the association relationships between the input bit string of the level 0 and the output bit string of the level 0 are switched based on the value of the bit string of the level 1.

In this example, the association relationships vary for each of the quadrants of the constellation, like the case where 64 QAM is used. It is, therefore, possible to achieve the PS using the asymmetric symbol mapping.

FIG. 14 is a diagram illustrating an example of the asymmetric symbol mapping when 256 QAM is used. In this example, bit strings are of levels 0 to 3. The bit string of the level 3 is an example of the predetermined bit string and is used to determine a quadrant of a symbol to be allocated.

For example, when both I and Q values of the bit string of the level 3 are "1", a quadrant of a symbol to be allocated is the third quadrant. In this asymmetric symbol mapping, values that are included in the bit strings of the levels 0 and 1 and correspond to symbols within the first and second quadrants adjacent to each other in the constellation, and values that are included in the bit strings of the levels 0 and 1 and correspond to symbols within the third and fourth quadrants adjacent to each other in the constellation are not symmetric with respect to the line between the first and second quadrants and the third and fourth quadrants.

FIG. 15 is a diagram illustrating an example of the LUT 211a when 256 QAM is used. In the LUT 211a, association relationships between input bit strings of the levels 0 to 2 and output bit strings of the levels 0 to 2 are registered.

In the LUT 211a, an input bit string of the level 3 and an output bit string of the bit 3 are registered. Although the value of the bit string of the level 3 is not converted, the association relationships between the input bit strings of the levels 0 to 2 and the output bit strings of the levels 0 to 2 are switched based on the value of the bit string of the level 3.

In this example, the association relationships vary for each of the quadrants of the constellation, like the case where 64 QAM is used. It is, therefore, possible to achieve the PS using the asymmetric symbol mapping. As described above, the encoding circuit 120 illustrated in FIG. 10 may be used for the other multilevel modulation.

The decoding circuit 121 according to the first embodiment is described below.

Figure 16:
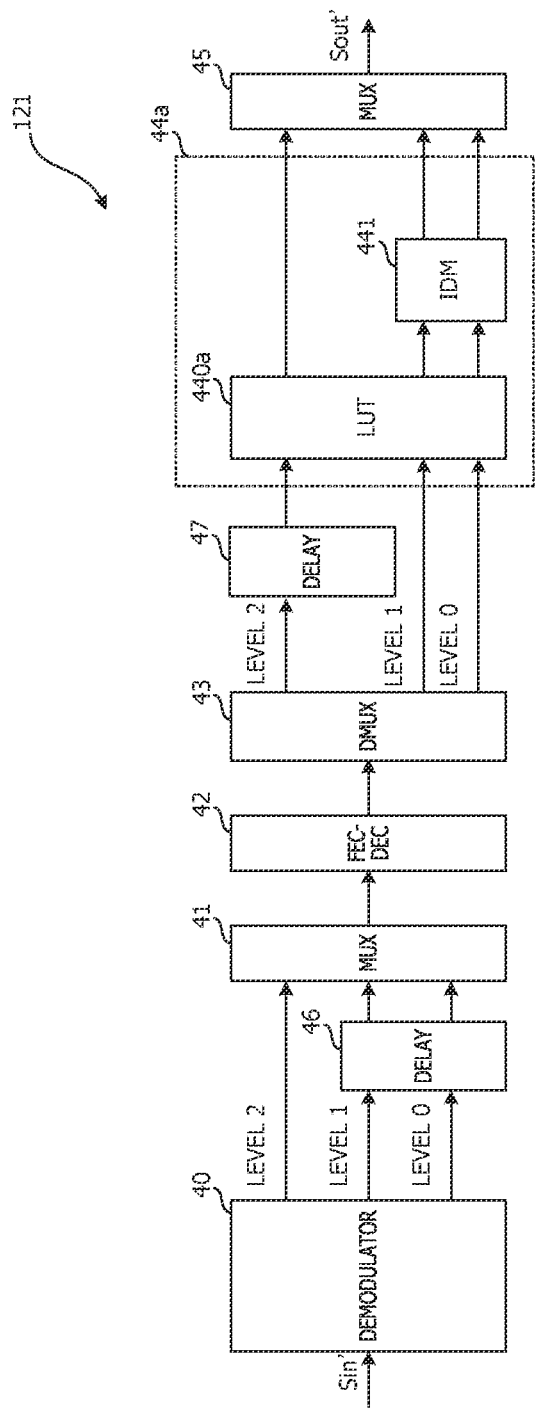
FIG. 16 is a diagram illustrating an example of a decoding circuit according to the first embodiment.

FIG. 16 is a configuration diagram illustrating the decoding circuit 121 according to the first embodiment. Configurations illustrated in FIG. 16 and common to those illustrated in FIG. 4 are indicated by the same reference signs as those illustrated in FIG. 4 and will not be described. The decoding circuit 121 according to the first embodiment corresponds to the encoding circuit 120 illustrated in FIG. 10. The decoding circuit 121 executes a decoding method according to the first embodiment.

The decoding circuit 121 includes a demodulator 40, a multiplexer 41, an FEC decoder 42, a demultiplexer 43, a PS inverse converter 44a, a multiplexer 45, and delay generators 46 and 47. The PS inverse converter 44a includes an LUT 440a and an IDM processing section 441.

The demodulator 40 is an example of a determiner and determines values of the bit strings of the levels 0 to 2 within a frame based on one symbol allocated to the bit strings of the levels 0 to 2. The bit string of the level 2 is input to the multiplexer 41. The bit strings of the levels 0 and 1 are input to the multiplexer 41 via the delay generator 46.

The delay generator 46 delays the bit strings of the levels 0 and 1 by the delay time Td of the parity bit within the encoding circuit 120. Therefore, the data #0 to #2 of the bit strings is input to the FEC decoder 42 in a state in which the top of the data #0 to #2 is aligned.

The FEC decoder 42 is an example of a corrector and corrects an error of the results of the determination by the demodulator 40 based on the parity bit inserted in the bit string of the level 2. The parity bit is inserted in the bit string of the level 2 within the frame succeeding the frame from which the parity bit has been generated by the encoding circuit 120. However, since the delay generator 46 delays the bit strings of the levels 0 and 1 by the time Td, the parity bit is included in the frame from which the parity bit has been generated. Therefore, decoding is normally executed.

The delay generator 46 delays the bit strings of the levels 0 and 1 in order to correct the error of the results of the determination by the demodulator 40 based on the parity bit inserted in the bit string of the level 2 within the frame succeeding the frame from which the parity bit has been generated. The delay generator 46 is an example of a first delay generator.

After the decoding, the bit string of the level 2 is input to the PS inverse converter 44a via the delay generator 47, and the bit strings of the levels 0 and 1 are input to the PS inverse converter 44a.

The delay generator 47 delays the bit string of the level 2 by the delay time Td of the parity bit in order for the PS inverse converter 44a to normally execute inverse conversion. Therefore, the frame configuration indicated by the reference sign Xb in FIG. 10 is regenerated.

The PS inverse converter 44a is an example of an inverse converter and inversely converts the values of the bit strings of the levels 0 and 1 converted so that, as a region within the constellation is closer to the center of the constellation, the number of symbols allocated in the region is larger. For example, the PS inverse converter 44a executes a process of restoring the values converted by the PS converter 21a of the encoding circuit 120 to the values before the conversion.

The PS inverse converter 44a includes the LUT 440a and the IDM processing section 441. The PS inverse converter 44a inversely converts the values of the bit strings of the levels 0 and 1 that have been converted by the LUT 211a of the encoding circuit 120 into the values before the conversion in the LUT 440a.

FIG. 17 is a diagram illustrating an example of the LUT 440a of the PS inverse converter 44a. In the LUT 440a, input bit strings of the levels 0 to 2 and output bit strings of the levels 0 to 2 are registered. The input bit strings are input to the LUT 440a from the demultiplexer 43 and the delay generator 47. The output bit strings are output from the LUT 440a to the multiplexer 45 and the IDM processing section 441.

The LUT 440a is obtained by replacing the input bit strings of the LUT 211a of the encoding circuit 120 with the output bit strings of the LUT 211a and replacing the output bit strings of the LUT 211a with the input bit strings of the LUT 211a. Therefore, the LUT 440a switches association relationships between values of the bit strings of the levels 0 and 1 before and after the conversion based on the value of the bit string of the level 2. The LUT 440a is composed of a memory circuit or the like, for example.

For example, when the value of the bit string of the level 2 is "0", values "0" and "0" of the input bit strings of the levels 0 and 1 are associated with values "1" and "1" of the output bit strings of the levels 0 and 1. When the value of the bit string of the level 2 is "1", the values "0" and "0" of the input bit strings of the levels 0 and 1 are associated with values "0" and "0" of the output bit strings of the levels 0 and 1. For example, the values of the output bit strings that are associated with the values "0" and "0" of the input bit strings vary depending on the value of the bit string of the level 2.

Therefore, the values of the bit strings of the levels 0 and 1 are restored to the values before the conversion by the LUT 211a. As the bit string of the level 2, the parity bit inserted in the bit string of the level 2 within the frame succeeding the frame of the bit strings of the levels 0 and 1 is to be used in accordance with the LUT 211a of the encoding circuit 120.

Therefore, the delay generator 47 delays the bit string of the level 2 by the delay time Td of the parity bit, compared to the bit strings of the levels 0 and 1.

The delay generator 47 delays the bit string of the level 2 in order to use the parity bit inserted in the bit string of the level 2 for the inverse conversion of the values of the bit strings of the levels 0 and 1 within the frame succeeding the frame from which the parity bit has been generated. The delay generator 47 is an example of a second delay generator and is, for example, a buffer circuit.

Refer to FIG. 16 again. The bit string of the level 2 is input to the multiplexer 45 from the LUT 440a. The bit strings of the levels 0 and 1 are input to the multiplexer 45 via the IDM processing section 441 from the LUT 440a. The IDM processing section 441 reduces the bias of the values of the bit strings.

The delay generators 46 and 47 delay the bit strings of the levels 0 to 2 based on the delay of the parity bit by the encoding circuit 120. The LUT 440a switches the association relationships between the values of the bit strings of the levels 0 and 1 before and after the conversion based on the value of the bit string of the level 2 in accordance with the LUT 211a of the encoding circuit 120.

Therefore, the decoding circuit 121 may normally decode the bit strings of the frame encoded by the encoding circuit 120.

Second Embodiment

The encoding circuit 120 illustrated in FIG. 10 inserts only the parity bit in the bit string of the level 2 within the succeeding frame, but may insert the parity bit and the data #2 in the succeeding frame. This facilitates various processes synchronized with the cycles T of the frames.

Figure 18:
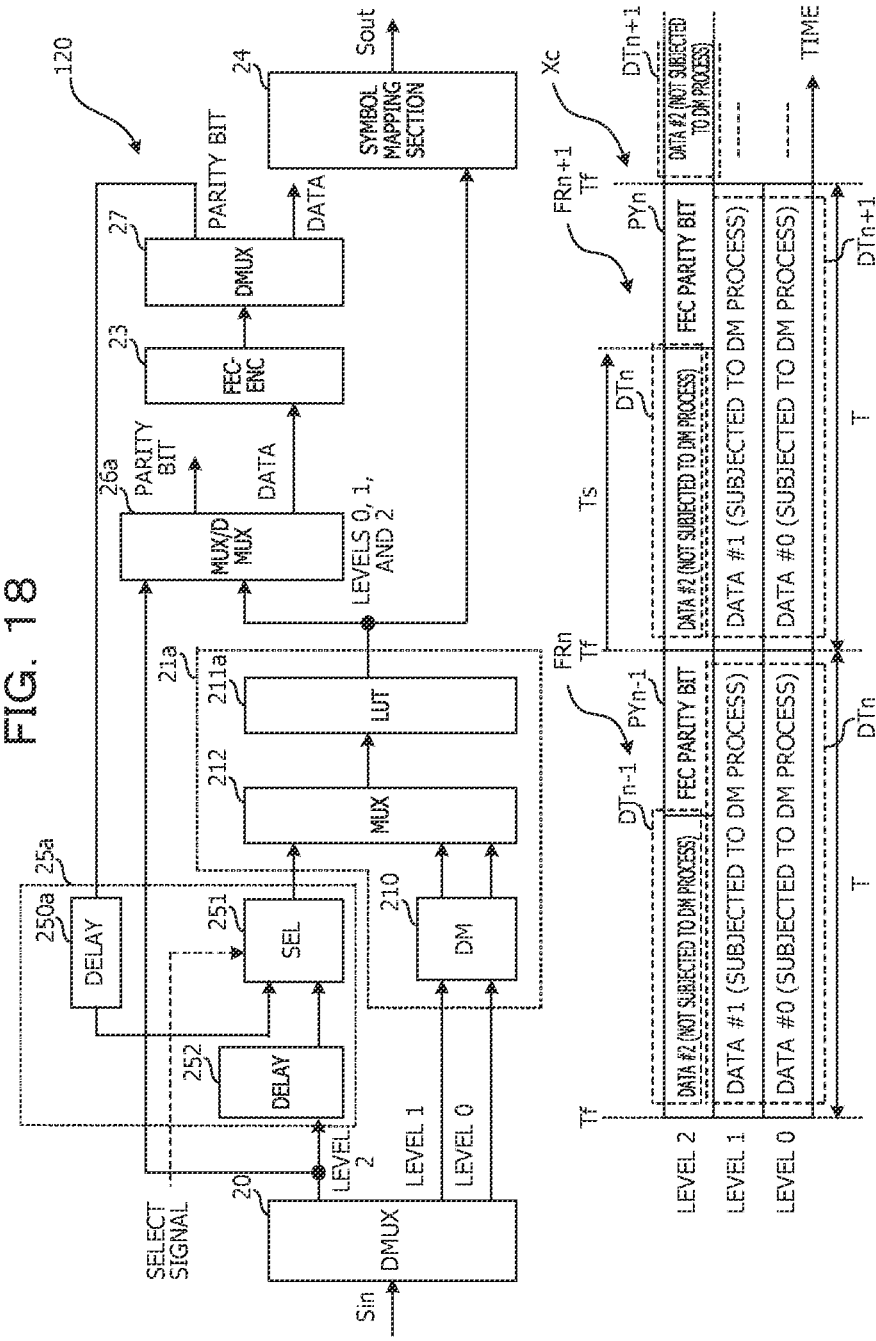
FIG. 18 is a configuration diagram illustrating an encoding circuit according to a second embodiment.

FIG. 18 is a configuration diagram illustrating an encoding circuit 120 according to a second embodiment. Configurations illustrated in FIG. 18 and common to those illustrated in FIG. 10 are indicated by the same reference signs as those illustrated in FIG. 10 and will not be described.

The encoding circuit 120 includes a parity bit inserting circuit 25a, instead of the parity bit inserting circuit 25, and includes a multiplexer and demultiplexer (MUX/DMUX) 26a, instead of the demultiplexer 26. The parity bit inserting circuit 25a includes delay generators 250a and 252 and a selector 251. The parity bit inserting circuit 25a is an example of the inserting circuit.

The delay generator 252 delays, by the cycle T of the frame, the bit string of the level 2 that has been output from the demultiplexer 20. Therefore, the bit string of the level 2 is input to the selector 251 later than the bit strings of the levels 0 and 1 by the cycle T. The data #2 of the bit string of the level 2 is inserted in the frame succeeding the frame input to the encoding circuit 120.

The delay generator 250a is different from the delay generator 250 in the delay time of the parity bit. The delay generator 250a delays the parity bit by the cycle T (>Td) of the frame and outputs the parity bit to the selector 251. Therefore, the parity bit is inserted in the end of the data #2 of the bit string of the level 2 of the frame succeeding the frame from which the parity bit has been generated. The delay generators 250a and 252 are, for example, buffer circuits.

The select signal gives an instruction to select the output data in accordance with time. Therefore, the selector 251 selects the bit string from the demultiplexer 20, for example, the data #2 at a time Tf corresponding to the top of the frame, and selects the parity bit from the delay generator 250a at a time (Tf+Ts). The time Ts corresponds to the amount of the data #2.

Therefore, as indicated by a reference sign Xc, the data #2 and the parity bit are inserted in the succeeding frame. For example, the data #2 of the frame FRn and the parity bit PYn are inserted in the succeeding frame FRn+1. In the same manner as described above, data #2 (DTn−1) and a parity bit PYn−1 that are included in the frame preceding the frame FRn are inserted in the frame FRn. Data #2 (DTn+1) and a parity bit that are included in the frame FRn+1 are inserted in the frame succeeding the frame FRn+1. In this example, the data #2 and a parity bit are inserted in a frame immediately succeeding a frame from which the parity bit has been generated. However, the data #2 and the parity bit may be inserted in any of frames succeeding the frame from which the parity bit has been generated.

The bit string of the level 2 is input to the delay generator 252 and the multiplexer and demultiplexer 26a from the demultiplexer 20. The bit strings of the levels 0 to 2 are input to the multiplexer and demultiplexer 26a from the LUT 211a. The multiplexer and demultiplexer 26a discards the bit string of the level 2 that has been input from the LUT 211a. The multiplexer and demultiplexer 26a multiplexes the bit string of the level 2 that has been input from the demultiplexer 20 and the bit strings of the levels 0 and 1 that have been input from the LUT 211a. The multiplexer and demultiplexer 26a outputs the multiplexed bit strings of the levels 0 to 2 to the FEC decoder 42. Therefore, the bit strings of the levels 0 to 2 are aligned and input to the FEC decoder 42, and a parity bit is normally generated from data #0 to #2 for each frame.

The parity bit inserting circuit 25a causes the delay generator 252 to delay the bit string of the level 2 before the insertion of the parity bit and insert the parity bit in the succeeding frame. Since the data #2 and the parity bit that are included in the bit string of the level 2 are collectively inserted in the succeeding frame, the various processes synchronized with the cycles T of the frames are facilitated.

The decoding circuit 121 corresponding to the encoding circuit 120 according to the second embodiment has the same configuration as that of the decoding circuit 121 illustrated in FIG. 16. The delay times given by the delay generators 46 and 47 of the decoding circuit 121 are equal to the cycle T of the frame based on the encoding circuit 120.

The foregoing embodiments are preferred embodiments of the present disclosure. However, the embodiments are not limited to this, and various modifications may be made without departing from the gist of the disclosure.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An encoding circuit comprising:
an allocator configured to allocate, to a plurality of bit strings within a first frame, a symbol that corresponds to each of values of the plurality of bit strings, the symbol being among a plurality of symbols within a constellation of multilevel modulation;
a converter configured to convert values of target bit strings that exclude a predetermined bit string among the plurality of bit strings so that, as a region within the constellation is closer to a center of the constellation, a number of symbols allocated in the region among the plurality of symbols is larger;
a generator configured to generate an error correction code for correcting an error of the plurality of bit strings after the conversion of the values of the target bit strings; and
an insertion circuit configured to delay the error correction code and insert the error correction code in the predetermined bit string within a second frame that succeeds the first frame,
wherein the allocator allocates, to the plurality of bit strings, one symbol that corresponds to the values of the target bit strings, the one symbol being among the plurality of symbols within a quadrant that corresponds to a value of the predetermined bit string and among a plurality of quadrants into which the constellation is partitioned, and
wherein the converter switches, based on the value of the predetermined bit string, association relationships between the values of the target bit strings before and after the conversion.

2. The encoding circuit according to claim 1, wherein the converter converts the values of the bit strings, based on the association relationships after biasing a probability distribution of the values of the target bit strings.

3. The encoding circuit according to claim 1, wherein the insertion circuit delays the predetermined bit string and inserts the predetermined bit string in the second frame before inserting the error correction code.

4. A decoding circuit comprising:
a determiner configured to determine, based on one symbol of a plurality of symbols within a constellation of multilevel modulation, each of values of a plurality of bit strings that are included in a first frame to which the one symbol is allocated;
a corrector configured to correct an error of determination results by the determiner, based on an error correction code inserted in a predetermined bit string among the plurality of bit strings;
an inverse converter configured to inversely convert values of target bit strings that exclude the predetermined bit string, the target bit strings having been converted so that, as a region within the constellation is closer to a center of the constellation, a number of symbols allocated in the region is larger;
a first delay generator configured to delay the target bit strings so that the error of determination results is corrected based on the error correction code inserted in the predetermined bit string within a second frame succeeding the first frame; and
a second delay generator configured to delay the predetermined bit string so that the error correction code inserted in the predetermined bit string is used to inversely convert values of bit strings that are included in the second frame and exclude the predetermined bit string within the second frame,
wherein one symbol that corresponds to the values of the target bit strings and is among symbols that are within a quadrant that corresponds to a value of the predetermined bit string and is among a plurality of quadrants into which the constellation is partitioned is allocated to the plurality of bit strings, and
wherein the inverse converter switches association relationships between the values of the target bit strings before and after the inverse conversion, based on the error correction code inserted in the predetermined bit string.

5. An encoding method comprising:
allocating, to a plurality of bit strings within a first frame, a symbol that corresponds to each of values of the plurality of bit strings, the symbol being among a plurality of symbols within a constellation of multilevel modulation;
converting values of target bit strings that exclude a predetermined bit string among the plurality of bit strings so that, as a region within the constellation is closer to a center of the constellation, a number of symbols allocated in the region among the plurality of symbols is larger;

generating an error correction code for correcting an error of the plurality of bit strings after the conversion of the values of the target bit strings;

delaying the error correction code; and inserting the error correction code in the predetermined bit string within a second frame that succeeds the first frame, wherein the allocating allocates, to the plurality of bit strings, one symbol that corresponds to the values of the target bit strings, the one symbol being among the plurality of symbols within a quadrant that corresponds to a value of the predetermined bit string and among a plurality of quadrants into which the constellation is partitioned, and wherein the converting switches, based on the value of the predetermined bit string, association relationships between the values of the target bit strings before and after the conversion.

6. The encoding method according to claim 5, wherein the converting converts the values of the bit strings, based on the association relationships after biasing a probability distribution of the values of the target bit strings.

7. The encoding method according to claim 5, wherein the delaying delays the predetermined bit string, and wherein the inserting inserts the predetermined bit string in the second frame before inserting the error correction code.

* * * * *